(12) United States Patent
Kuppa et al.

(10) Patent No.: US 11,729,198 B2
(45) Date of Patent: Aug. 15, 2023

(54) MAPPING A VULNERABILITY TO A STAGE OF AN ATTACK CHAIN TAXONOMY

(71) Applicant: Tenable, Inc., Columbia, MD (US)

(72) Inventors: Aditya Kuppa, Dublin (IE); Lamine Aouad, Paris (FR); Thomas Parsons, Donegal Town (IE)

(73) Assignee: Tenable, Inc., Columbia, MD (US)

( * ) Notice: Subject to any disclaimer, the term of this patent is extended or adjusted under 35 U.S.C. 154(b) by 482 days.

(21) Appl. No.: 16/880,198

(22) Filed: May 21, 2020

(65) Prior Publication Data

US 2021/0367961 A1 Nov. 25, 2021

(51) Int. Cl.
*G06N 20/00* (2019.01)
*G06F 40/205* (2020.01)
*G06F 40/30* (2020.01)
*G06N 5/04* (2023.01)
*H04L 9/40* (2022.01)

(52) U.S. Cl.
CPC ........ *H04L 63/1433* (2013.01); *G06F 40/205* (2020.01); *G06F 40/30* (2020.01); *G06N 5/04* (2013.01); *G06N 20/00* (2019.01)

(58) Field of Classification Search
CPC ...... H04L 63/1433; G06N 20/00; G06N 5/04; G06F 40/205; G06F 40/30
USPC .......................................................... 726/25
See application file for complete search history.

(56) References Cited

U.S. PATENT DOCUMENTS

| 11,405,419 B2 * | 8/2022 | Chen ................... H04L 63/1416 |
| 2015/0269383 A1 * | 9/2015 | Lang ....................... G06F 21/57 726/1 |
| 2016/0044057 A1 * | 2/2016 | Chenette ............. H04L 63/1433 726/1 |
| 2016/0241580 A1 * | 8/2016 | Watters ................... H04L 63/20 |
| 2018/0324207 A1 * | 11/2018 | Reybok, Jr. ........... G06F 16/951 |
| 2019/0028557 A1 * | 1/2019 | Modi .................... G06F 21/316 |
| 2019/0052665 A1 | 2/2019 | Mahieu et al. |
| 2019/0147162 A1 * | 5/2019 | Mejbah Ul Alam .. G06N 3/088 726/23 |
| 2020/0014711 A1 * | 1/2020 | Rego ..................... H04L 43/045 |

(Continued)

FOREIGN PATENT DOCUMENTS

WO 2019089389 A1 5/2019

OTHER PUBLICATIONS

Zainab Danish, "Making Sense of Unstructured Intelligence Data Using NLP" https://www.trustar.co/blog/making-sense-of-unstructured-data-using-nlp, Mar. 8, 2020.

(Continued)

*Primary Examiner* — Thanh T Le

(74) *Attorney, Agent, or Firm* — Muncy, Geissler, Olds & Lowe, P.C.; Daniel Podhajny

(57) ABSTRACT

In an embodiment, a semantic model and a semantic model training method that obtains a textual description of one or more features associated with a first vulnerability that has been used in one or more attacks. Text is parsed from the first textual description in accordance with one or more rules. The system determines a first label for the first vulnerability that is associated with one or more of a plurality of stages of an attack chain taxonomy. The model is generated or refined to map the parsed text to the first label associated with the one or more stages of the attack chain taxonomy.

18 Claims, 15 Drawing Sheets

(56) References Cited

U.S. PATENT DOCUMENTS

| | | | |
|---|---|---|---|
| 2020/0057858 A1* | 2/2020 | Sharma | G06N 20/20 |
| 2020/0162496 A1* | 5/2020 | Medalion | H04L 63/1416 |
| 2021/0326531 A1* | 10/2021 | Kumar | G06F 40/279 |

OTHER PUBLICATIONS

Husari et al., "TTPDrill: Automatic and Accurate Extraction of Threat Actions from Unstructured Text of CTI Sources" ACSAC 2017, Orlando, FL, USA © 2017 ACM. 978-1-4503-5345-8/17/12, pp. 103-115.

Alperin et al., "Risk Prioritization by Leveraging Latent Vulnerability Features in a Contested Environment" AISec'19, Nov. 15, 2019, London, United Kingdom © 2019 Copyright held by the owner/author(s). Publication rights licensed to ACM. ACM ISBN 978-1-4503-6833-9/19/11, pp. 49-57.

* cited by examiner

| | PRIVILEGE-ESCALATION | COMMAND-AND-CONTROL | PERSISTENCE | LATERAL-MOVEMENT | INITIAL-ACCESS | COLLECTION |
|---|---|---|---|---|---|---|
| CREDENTIAL DUMPING | | | | | | |
| WINLOGON HELPER DLL | | | 174 | | | |
| ACCESSIBILITY FEATURES | 6 | | 6 | | | |
| SHORTCUT MODIFICATION | | | 293 | | | |
| COMMAND-LINE INTERFACE | | | | | | |
| EXPLOITATION FOR PRIVILEGE ESCALATION | 6974 | | | | | |
| REMOTE DESKTOP PROTOCOL | | | | 1 | | |
| VALID ACCOUNTS | 7 | | 7 | 346 | 7 | |
| TAINT SHARED CONTENT | | | | | | |
| FILE AND DIRECTORY DISCOVERY | | | | | | |
| ACCOUNT DISCOVERY | | | | | | |
| DISABLING SECURITY TOOLS | | | | | | |
| ACCOUNT MANIPULATION | | | 749 | | | |
| WEB SHELL | 386 | | 386 | | | |
| WEB SERVICE | | 1 | | | | |
| COMPONENT FIRMWARE | | | 6 | | | |
| BRUTE FORCE | | | | | | |
| INSTALL ROOT CERTIFICATE | | | | | | |
| PRIVATE KEYS | | | | | | |
| BROWSER EXTENSIONS | | | 2 | | | |
| SSH HIJACKING | | | | 4 | | |
| USER EXECUTION | | | | | | |
| SPEARPHISHING ATTACHMENT | | | | | 1087 | |
| EXPLOITATION FOR DEFENSE EVASION | | | | | | |
| DRIVE-BY COMPROMISE | | | | | 99 | |
| TRUSTED RELATIONSHIP | | | | | 87 | |
| EXPLOITATION OF REMOTE SERVICES | | | | 3883 | | |
| EXPLOIT PUBLIC-FACING APPLICATION | | | | | 4323 | |
| DATA FROM INFORMATION REPOSITORIES | | | | | | 3 |
| TEMPLATE INJECTION | | | | | | |
| COMPILED HTML FILE | | | | | | |
| FILE AND DIRECTORY PERMISSIONS MODIFICATION | | | | | | |
| TRANSMITTED DATA MANIPULATION | | | | | | |
| FIRMWARE CORRUPTION | | | | | | |
| VIRTUALIZATION/SANDBOX EVASION | | | | | | |
| STEAL WEB SESSION COOKIE | | | | | | |
| ACCOUNT ACCESS REMOVAL | | | | | | |

FIG. 13A

| | EXECUTION | DISCOVERY | DEFENSE-EVASION | CREDENTIAL-ACCESS | IMPACT |
|---|---|---|---|---|---|
| CREDENTIAL DUMPING | | | | | |
| WINLOGON HELPER DLL | | | | | |
| ACCESSIBILITY FEATURES | | | | | |
| SHORTCUT MODIFICATION | | | | | |
| COMMAND-LINE INTERFACE | 260 | | | | |
| EXPLOITATION FOR PRIVILEGE ESCALATION | | | | | |
| REMOTE DESKTOP PROTOCOL | | | | | |
| VALID ACCOUNTS | | | 7 | | |
| TAINT SHARED CONTENT | | | | 17 | |
| FILE AND DIRECTORY DISCOVERY | | 4 | | | |
| ACCOUNT DISCOVERY | | 181 | | | |
| DISABLING SECURITY TOOLS | | | 17 | | |
| ACCOUNT MANIPULATION | | | | 749 | |
| WEB SHELL | | | | | |
| WEB SERVICE | | | 1 | | |
| COMPONENT FIRMWARE | | | 6 | | |
| BRUTE FORCE | | | | 194 | |
| INSTALL ROOT CERTIFICATE | | | 1222 | | |
| PRIVATE KEYS | | | | 99 | |
| BROWSER EXTENSIONS | | | | | |
| SSH HIJACKING | | | | | |
| USER EXECUTION | 2411 | | | | |
| SPEARPHISHING ATTACHMENT | | | | | |
| EXPLOITATION FOR DEFENSE EVASION | | | 3273 | | |
| DRIVE-BY COMPROMISE | | | | | |
| TRUSTED RELATIONSHIP | | | | | |
| EXPLOITATION OF REMOTE SERVICES | | | | | |
| EXPLOIT PUBLIC-FACING APPLICATION | | | | | |
| DATA FROM INFORMATION REPOSITORIES | | | | | |
| TEMPLATE INJECTION | | | 2 | | |
| COMPILED HTML FILE | 425 | | 425 | | |
| FILE AND DIRECTORY PERMISSIONS MODIFICATION | | | 660 | | |
| TRANSMITTED DATA MANIPULATION | | | | | 3 |
| FIRMWARE CORRUPTION | | | | | 6 |
| VIRTUALIZATION/SANDBOX EVASION | | 36 | 36 | | |
| STEAL WEB SESSION COOKIE | | | | 180 | |
| ACCOUNT ACCESS REMOVAL | | | | | 10 |

FIG. 13B

MAPPING A VULNERABILITY TO A STAGE OF AN ATTACK CHAIN TAXONOMY

TECHNICAL FIELD

The various aspects and embodiments described herein generally relate to mapping a vulnerability to stage(s) of an attack chain taxonomy.

BACKGROUND

Identifying vulnerabilities (CVEs) that are actively exploited or may potentially be exploited by attackers and understanding how a vulnerability can enable the attacker at each stage of the attack life cycle is absolutely critical for vulnerability assessments, designing risk models for a vulnerability management system, and understanding attacker actions in a given environment.

Given that no CVE is easily classified into an attack chain taxonomy and the volume of vulnerabilities disclosed, defenders lack a concrete approach to prioritize CVEs based on their role in the attack chain and in the context of controls in place. Knowing the intrusion technique for a given CVE, defenders can assess the risk of the CVE based on the stage at which attackers are using the CVE, and deploy controls to monitor for the intrusions. Furthermore, once the intrusion technique is known, a defender can group techniques by tactics to prioritize vulnerabilities for patching.

However, there is presently no source for such use case information for the many thousands of CVEs reported every year, and the manual effort involved in such classification results in networks being exposed to many of these CVEs.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an embodiment, a semantic model obtains at least one first textual description of one or more features associated with a first vulnerability that has been used in one or more attacks and parses text from the at least one first textual description in accordance with one or more rules. The semantic model then determines at least one first label for the first vulnerability that is associated with one or more of a plurality of stages of an attack chain taxonomy. From this determination, the semantic model is refined or generated, the semantic model mapping the parsed text to the at least one first label associated with the one or more stages of the attack chain taxonomy.

In an embodiment, the at least one first label is inserted into a joint label space and at least one second label related to one or more intrusion techniques is also inserted into the joint label space. The semantic model generates at least one technique label based on labels in the joint label space. The determination of the at least one first label for the first vulnerability is based on context extracted from the parsed text. The generation of the at least one technique label is based on a distance function between the at least one second label and the at least one first label.

In an embodiment, a method that begins by obtaining at least one textual description of one or more features associated with a vulnerability and/or exploit and parsing text from the at least one textual description in accordance with one or more rules. A model, such as the trained semantic model, is obtained that maps textual data to labels for the one or more features of the vulnerability and/or exploit to respective stages of an attack chain taxonomy. The model maps the parsed text to at least one first label for the first vulnerability associated with one or more stages of the attack chain taxonomy in accordance with the model.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIGS. 13A and 13B together illustrate a mapping of labels to a two-dimensional space representing attack techniques and attack taxonomy in accordance with an embodiment of the disclosure.

DETAILED DESCRIPTION

Figure 1:
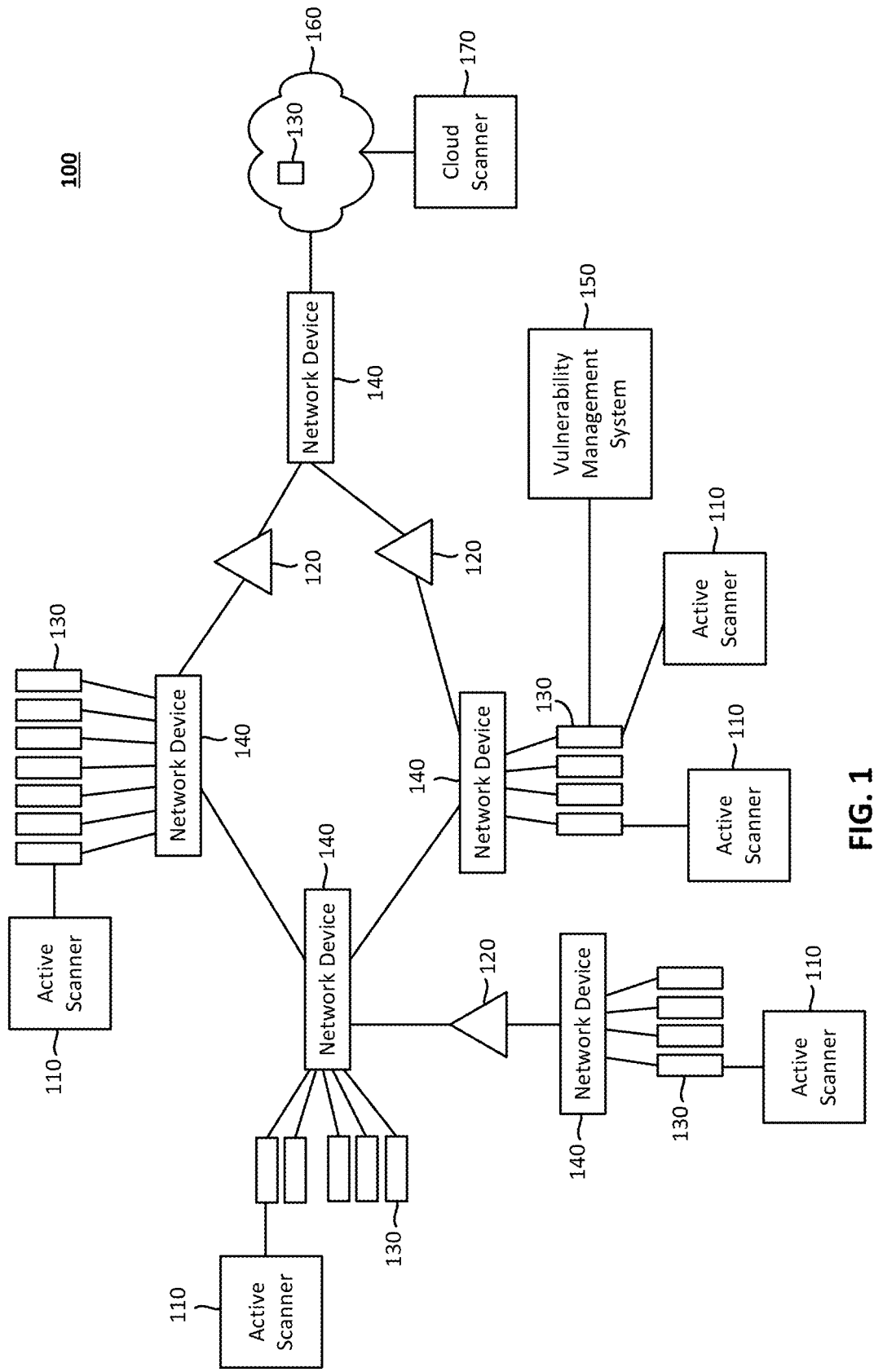
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
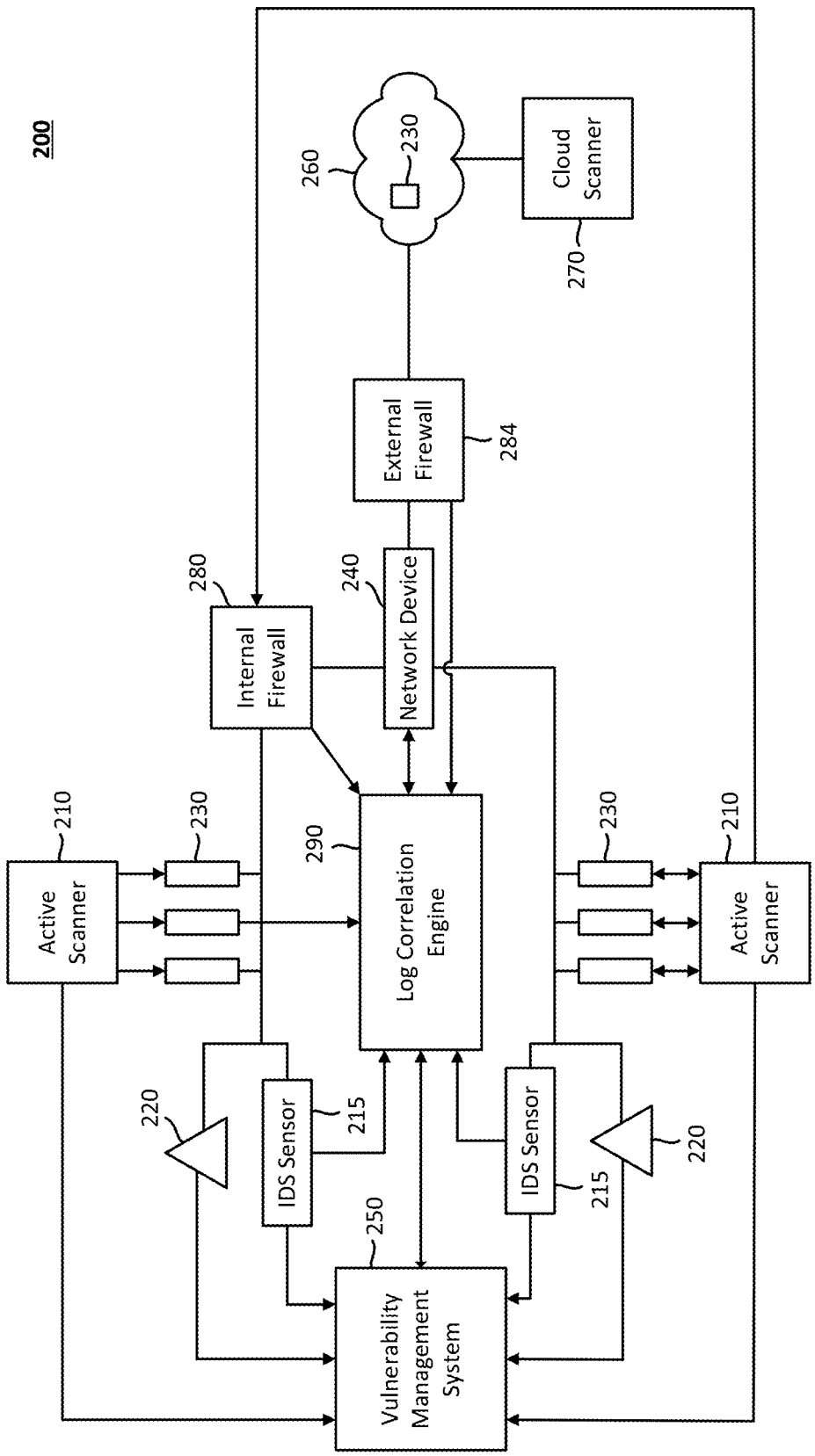
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.

For solutions matching "Upgrade to <product> x.y.z" where x, y, and z are integers, select a single result with the highest x.y.z value (comparing against x first, then y, then z).

For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Figure 3:
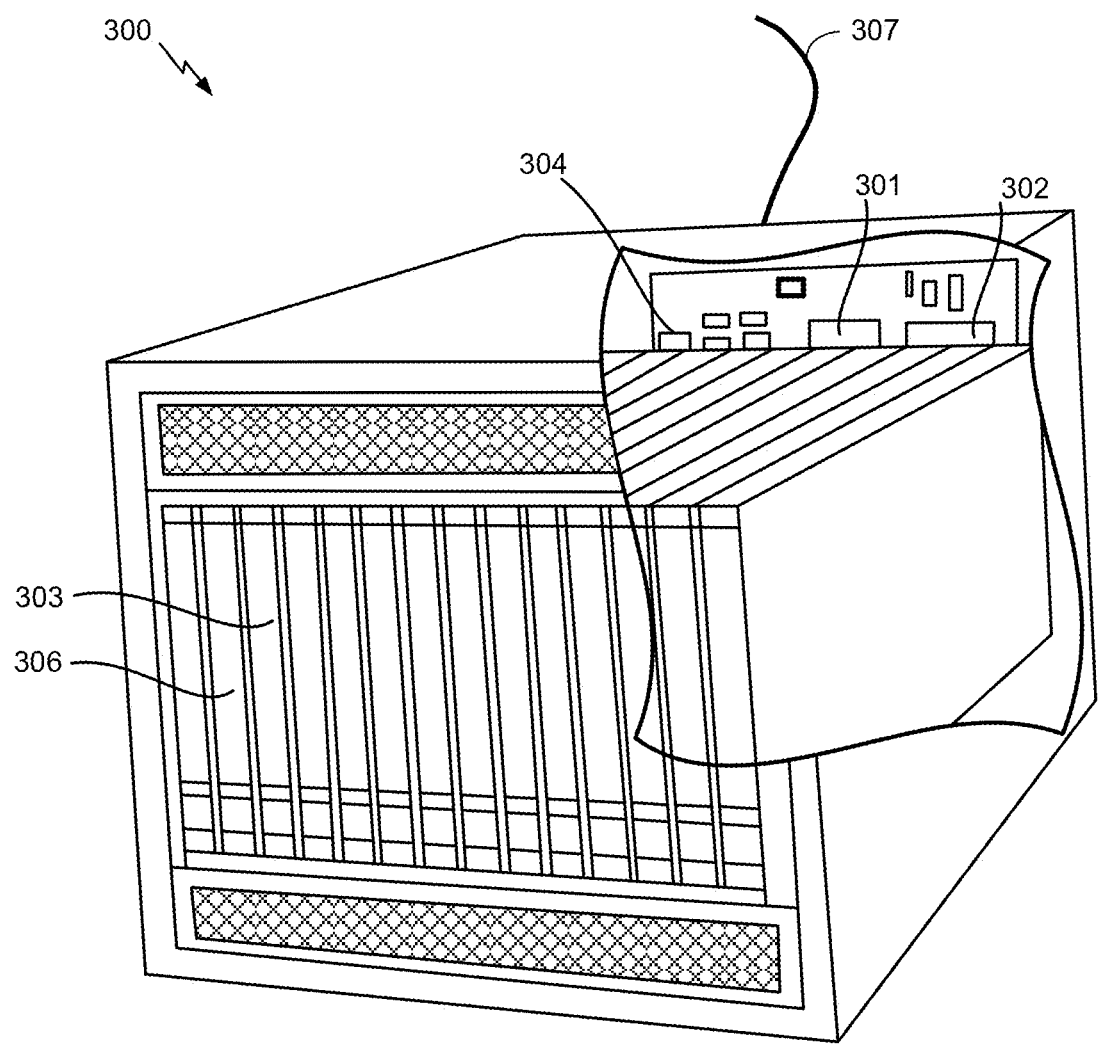
FIG. 3 illustrates a server in accordance with an embodiment of the disclosure.

The various embodiments may be implemented on any of a variety of commercially available server devices, such as server 300 illustrated in FIG. 3. In an example, the server 300 may correspond to one example configuration of a server on which a security auditing application may execute, which in certain implementations may be included as part of the vulnerability management system 150 of FIG. 1 or the vulnerability management system 250 of FIG. 2. In FIG. 3, the server 300 includes a processor 301 coupled to volatile memory 302 and a large capacity nonvolatile memory, such as a disk drive 403. The server 300 may also include a floppy disc drive, compact disc (CD) or DVD disc drive 306 coupled to the processor 301. The server 300 may also include network access ports 304 coupled to the processor 301 for establishing data connections with a network 307, such as a local area network coupled to other broadcast system computers and servers or to the Internet.

Figure 4:
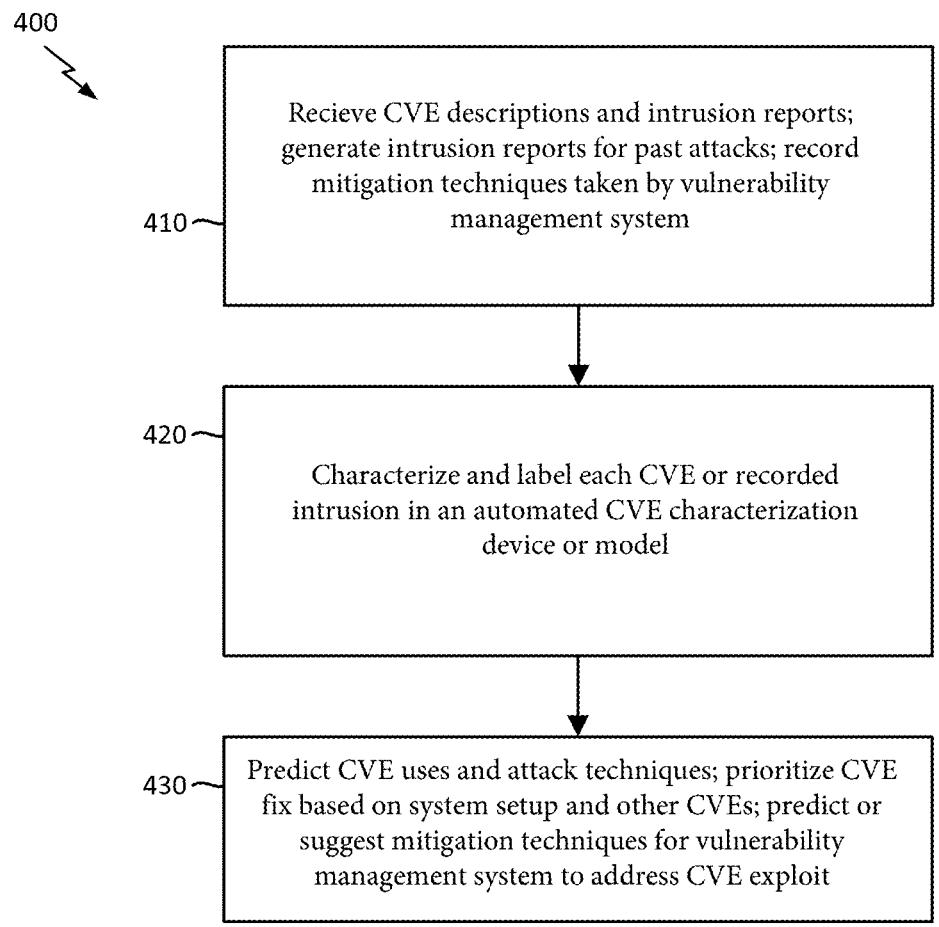
FIG. 4 illustrates an exemplary process for creating and applying a vulnerability characterization model an enterprise network in accordance with an embodiment of the disclosure.

FIG. 4 illustrates a process 400 provides for continuous improvement of the functionality and performance of the vulnerability management system 250 in accordance with an embodiment of the disclosure. In some designs, the process 400 is advantageously automated so that a manual extraction of descriptions of vulnerabilities is not needed. Furthermore, the system may be able to automatically prioritize various vulnerabilities for correction without human intervention. The details of this process are illustrated further in FIG. 8-12.

At 410, the vulnerability management system 250 receives a CVE description or intrusion report, generates intrusion reports for past attacks, or records mitigation techniques taken by the vulnerability management system 250 in response to a breach. This information may be received from external databases (e.g., GOOGLE project zero). Any data that is parsed from CVE-related sources in this manner is broadly described herein as a CVE "feature".

At 420, the vulnerability management system 250 characterizes and labels each CVE or recorded intrusion in an automated CVE characterization device, such as computing device 501, in accordance with a model. As used herein, a CVE "label" is determined based on its associated CVE features, and is used to characterize the attack chain taxonomy (e.g., ATT&CK) stage(s) associated with the CVE. Examples of how the model is generated and refined (or trained) are described in more detail below.

At 430, the vulnerability management system 250 predicts CVE uses and attack techniques using the model, prioritizes CVE fixes based on the system setup and other CVEs, or predicts or suggests mitigation techniques for the vulnerability management system to use to address the CVE exploit. These predicted features of each CVE add to the knowledge database of the vulnerability management system 150/250 (i.e., the model is continually trained or refined based on new data). Thus, without human intervention, the system and/or model is capable of discovering or predicting possible uses and mitigation strategies based only on a CVE description.

Figure 5:
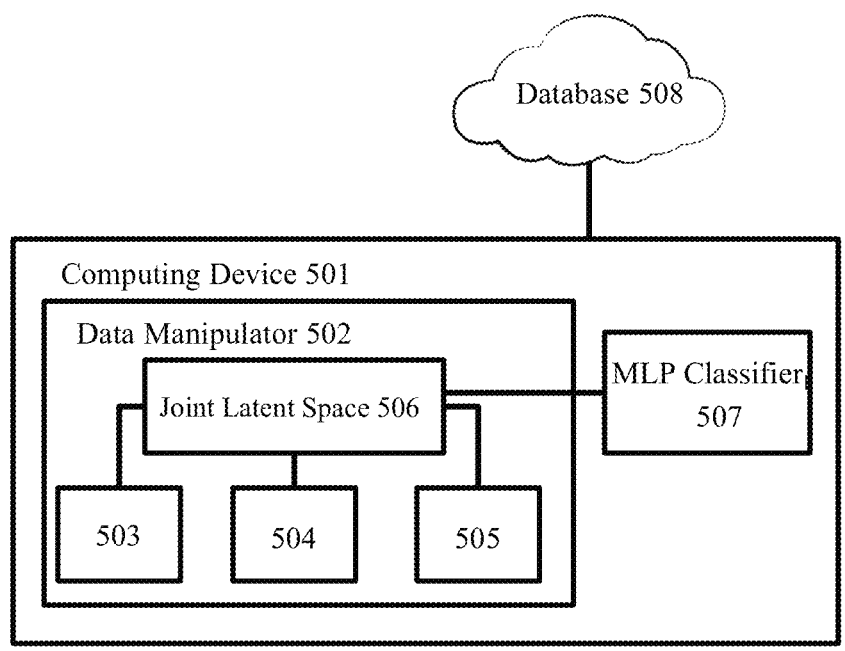
FIG. 5 illustrates a system for characterizing vulnerabilities in accordance with an embodiment of the disclosure.

In at least one embodiment, the vulnerability management system 250 further includes a computing device 501 as in FIG. 5 for analyzing CVEs and fitting the CVEs into possible attack sequences. In some designs, the computing device 501 may be a commercial server device as illustrated in FIG. 3 or may be a dedicated device or ASIC that is embedded in the network 200. The computing device 501 may connect to external database(s) 508 to receive CVE information, exploit reports, and/or network logs. The computing device 501 may also transmit analysis data to the external database(s) 508 to assist the vulnerability management system in identifying and prioritizing CVEs.

The computing device 501 may include a data manipulator 502 that provides digital storage space for structured and unstructured data as well as data processing capabilities for data analysis. The data manipulator 502 may include many nodes and connections in a hierarchical or layered structure to facilitate mapping of data points to each other. For example, the connections may be ordered via a convolutional neural network, a recurrent neural network, or other neural network operated by the data manipulator. Specifically, in at least one embodiment, the data manipulator may perform sorts, filters, comparisons, correlations, similarity determinations, and/or other data analysis.

The data manipulator 502 as illustrated in FIG. 5 may include a joint latent space 506 that stores data and a context encoder 503, a label encoder 504, and a transform network 505. The context encoder 503 may feed the joint latent space 506 with data objects encoded, extracted or characterized by the context encoder 503. The label encoder 504 may feed the joint latent space 506 with data objects encoded, extracted or characterized by the label encoder 504. The transform network 505 may perform additional data analysis on the data objects encoded by the context encoder 503 and the label encoder 504. The transformer network 505 may receive data objects and reprocess them back to the joint latent space 506 with additional or new embeddings. The computing device 501 may include a Multi-Layer Perceptron (MLP) classifier 507 that operates on the joint latent space 506 and arranges the data objects of the joint latent space 506. In addition, the MLP classifier 507 may output data objects as results to the external database(s) 508. These results may be used by the vulnerability management system 250.

Intrusion techniques comprise the actions that adversaries (or attackers) attempt to perform to accomplish goals and are the foundation of the vulnerability model. Adversarial Tactics, Techniques & Common Knowledge (ATT&CK) is one example of an attack chain taxonomy developed by MITRE. The aim of ATT&CK as defined by MITRE is to categorize adversary behavior to help improve post-compromise detection of advanced intrusions. Software vulnerabilities (CVEs) play an important role in cyber-intrusions, and are mostly classified into four ATT&CK techniques, which cover the exploitation phases (or stages) of the attack chain.

Figure 6:
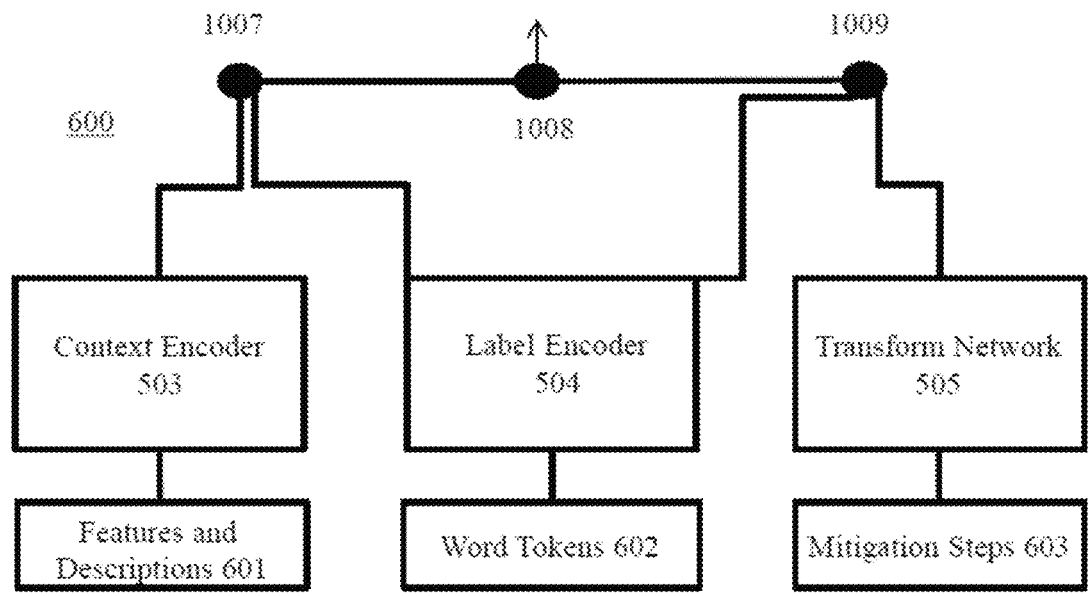
FIG. 6 illustrates a schematic of a system for characterizing vulnerabilities in accordance with an embodiment of the disclosure.

The context encoder 503, the label encoder 504, and the transform network 505 are embedding modules illustrated in more detail in FIG. 6. Specifically, a labeling and filtering pipeline 600 connects the context encoder 503, the label encoder 504, and the transform network 505 for output to the joint latent space 506. The context encoder 503 is connected to the label encoder 504 at a combination node 1007. The label encoder 504 and the transform network are connected at another combination node 1009. Each of the nodes connecting the data processors 503, 504, 505 also connects to the central node 1008 which transmits data to the joint latent space 506. Each of the nodes may combine, connect, or filter the outputs of the context encoder 503, the label encoder 504, and the transform network 505 according to one or more rules or algorithms.

The context encoder 503 receives features and descriptions 601 from parsers of unstructured data. The unstructured data may include CVE descriptions, exploit reports, zero days, leaked or auctioned data, and intrusions detected by the passive scanners 120 or the active scanners 110. The label encoder 504 receives word and character tokens 602 which are also generated from unstructured data. The unstructured data translated into word tokens 602 may originate in Adversarial Tactics, Techniques & Common Knowledge (ATT&CK) descriptions that describe attack or intrusion sequences from intrusion logs.

The transform network 505 may also receive data objects with mitigation steps 603 that are parsed from exploit reports, intrusion reports, or imported from a database of mitigation techniques and patches. In addition, the transform network 505 may receive data objects from the joint latent space 506 and use feedback to add embeddings and improve the data objects. Specifically, the transform network may receive the pre-exploit descriptions (e.g. exploited system configuration) and post-exploit descriptions (e.g. recovery method, logs, or isolation method) as textual descriptions, parsed textual descriptions, or encoded text. The mitigation steps 603 may also be generated from unstructured data or information from the vulnerability management system. The transform network 505 may be a non-linear or recursive processor of the data objects or textual information.

Figure 7A:
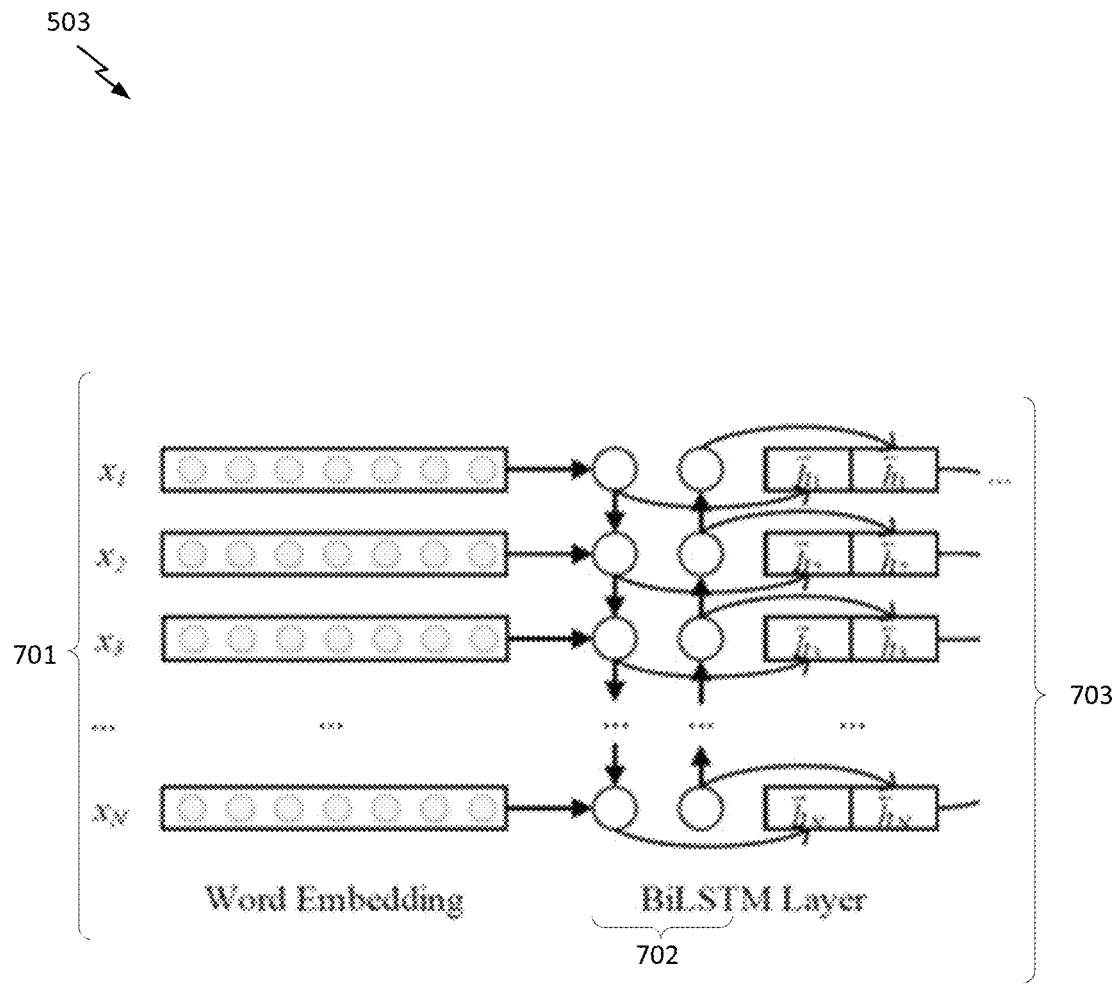
FIG. 7A illustrates a context encoder of the system in accordance with an embodiment of the disclosure.
Figure 7B:
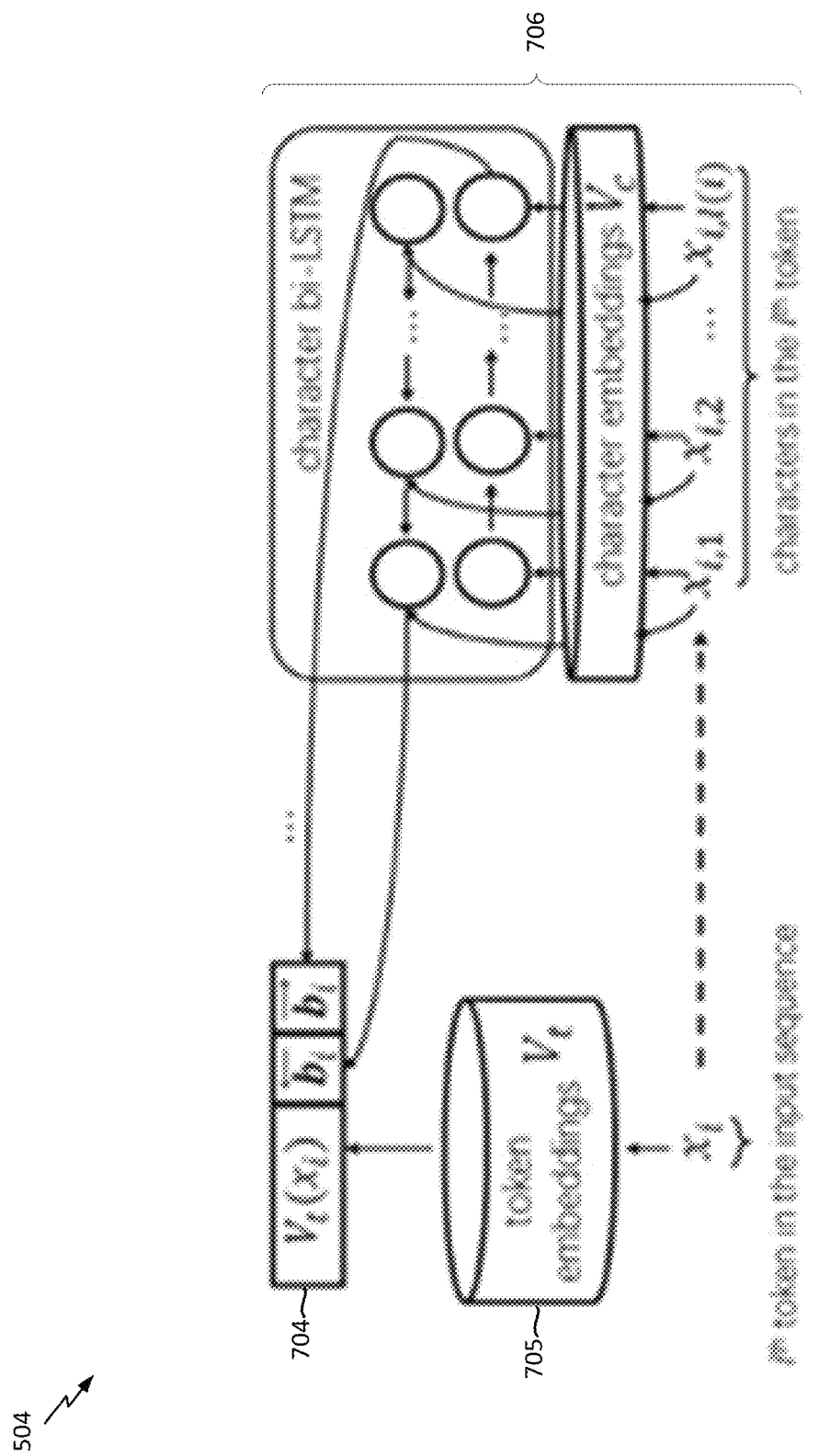
FIG. 7B illustrates a label encoder of the system in accordance with an embodiment of the disclosure.
Figure 7C:
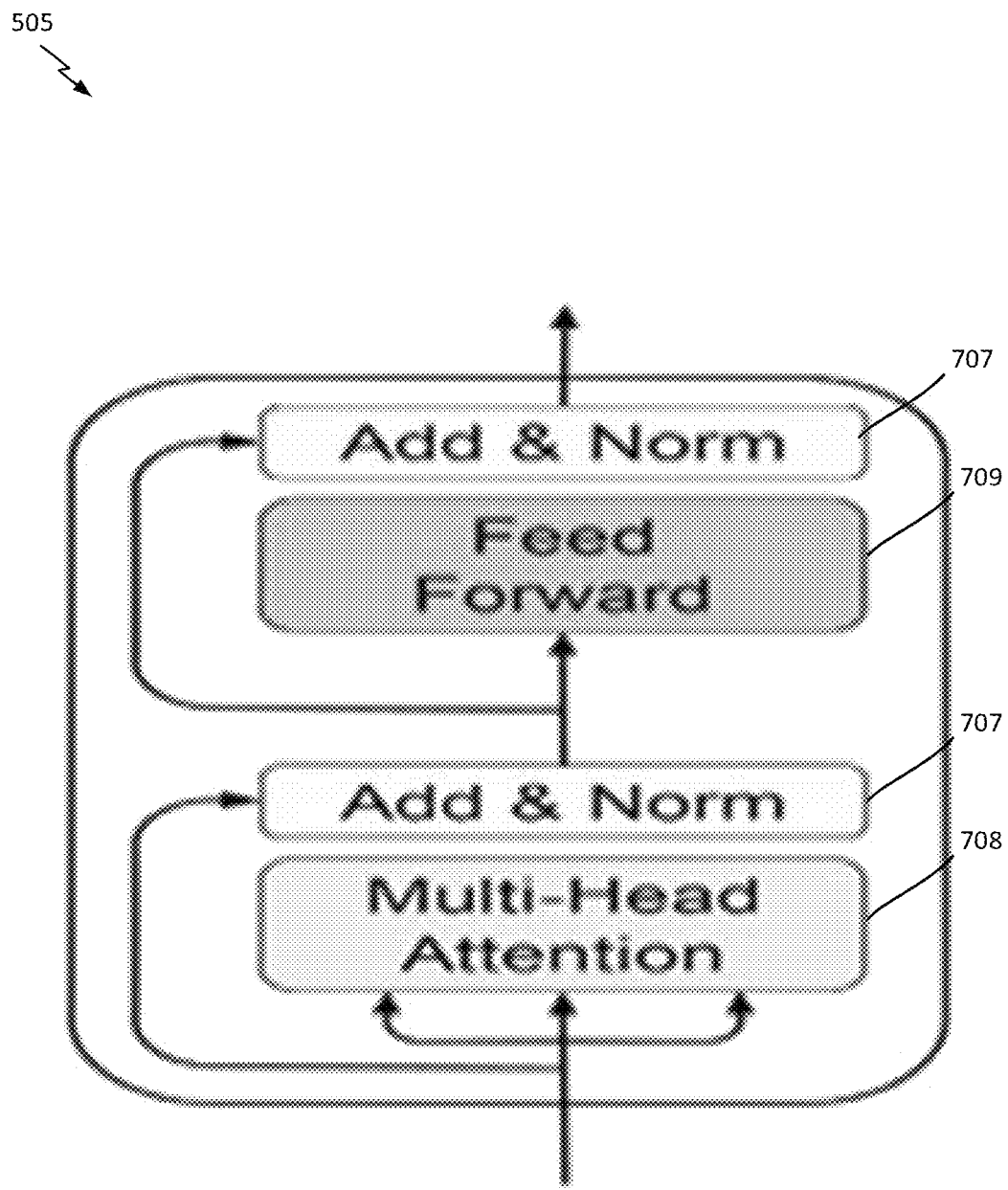
FIG. 7C illustrates a transform network of the system in accordance with an embodiment of the disclosure.

The context encoder 503 includes word tokens 701 inputted to the system from the features and descriptions 601. The word tokens 701 are generated by a word parser (e.g. word2vec) that converts natural language to word strings or tokens 701 that are in are arranged in an array as shown in FIG. 7A. The word tokens 701 are input into a bi-Long Short Term Memory model 702 that outputs context labels 703 to the first combination node. The bi-Long Short Term Memory model 702 is based on an artificial recurrent neural network architecture with feedback to process sequential streams of tokens into labels and/or embeddings.

The label encoder 504 receives word token embeddings 705 and character-based token embeddings and inputs the embeddings into another bi-Long Short Term Memory (LSTM) model 706. The embeddings include word and character tokens 602 that are derived from descriptions of intrusion techniques (e.g. ATT&CK stages). The label encoder 504 may apply a parser (e.g. word2vec) to the inputs to convert the data to embeddings or vectors. The LSTM model outputs a label 704 to the first combination node and the second combination node. The labels 704 are output to each combination node for improved embeddings and similarity analysis at the nodes.

A single layer of the transformer network 505 includes at least two feedback loops and connections to other layers of the transformer network 505. Each loop includes a stage to add bias and normalize 707 the labels. Layer normalization, LayerNorm(x+Sublayer(x)), is also used after each sublayer, where Sublayer(x) denotes the sub-layer function. In addition, a first loop includes a multi-head self-attention stage 708 that identifies similarity between newly coded labels 704 and mitigation steps. In the transform network 505, each key, query, and value may be a vector corresponding to a sentence. The transformer network 505 may also receives tokens with mitigation techniques, patches, or protection protocols. In some designs, the output of the transformer module is an embedding vector. The transformer block captures the context of the CVE with respect to mitigations and exploit steps. This helps to improve the labeling of other heads and also handles cases of missing data in other heads (i.e. when data is not sparse in textual descriptions of exploits).

A self-attention stage such as stage 708 computes a new value for each vector by comparing it with all vectors (including itself). Additionally, a multi-head transform as in stage 708 transforms an array of vectors and then applies attention to teach head before performing a final transformation. In addition to attention sub-layers, in some designs, each of the layers in the encoder and decoder of the transform network 505 contains a fully connected feed-forward network 709, which is applied to each position separately and identically. Each layer of the transformer network may include a position-wise feed-forward sub-layer 709 that compares across positions of a vector array and passes input through one or more layers of neural networks before output. Residual connections may be maintained across layers or sublayers for easy passage of information through a deep stack of layers.

In some designs, the model architecture of the labelling and filtering pipeline 600 may be adapted to encode labels from unstructured data. These labels are then fed into the joint latent space 506. Newly discovered CVEs may also be run through the context encoder side of the labelling and filtering pipeline 600 starting with their features and descriptions 601 being input to the context encoder 503. The labels output by the context encoder 503 for the new CVEs are passed on to the joint latent space for further analysis. In this sense, the whole model architecture functions both to create a model trained with machine learning but also to ingest new information and contextualizing it.

Figure 8:
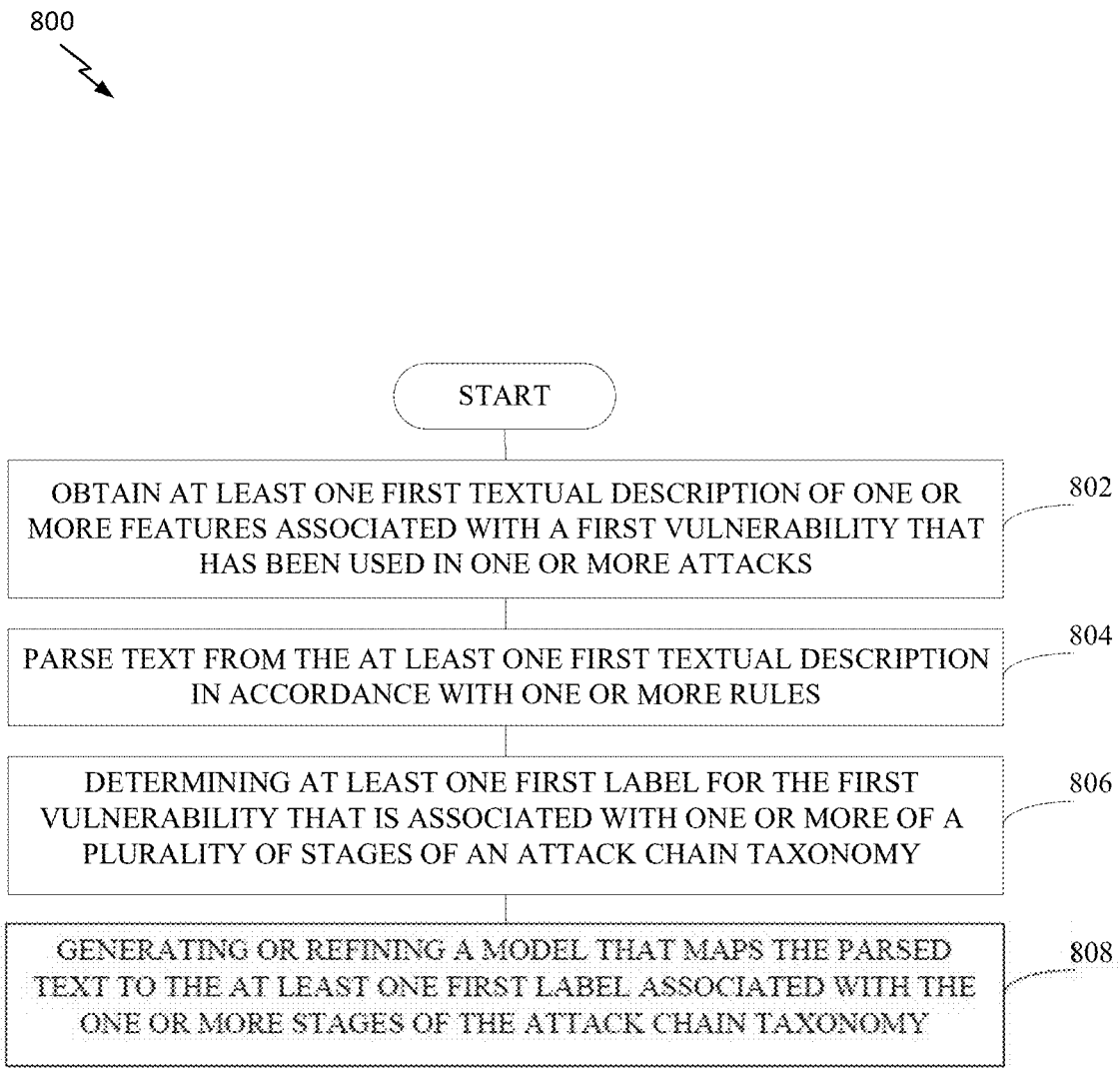
FIG. 8 illustrates a process for generating a model in accordance with an embodiment of the disclosure.

FIG. 8 illustrates for a process of creating the model from various unstructured inputs according to an embodiment of the disclosure. In an example, the process of FIG. 8 may be implemented via a vulnerability management system, such as the vulnerability management system 250 of FIG. 2.

At 802, the system obtains at least one first textual description of one or more features associated with a first vulnerability that has been used in one or more attacks. The textual description inputted during the model building process may be more detailed than a simple CVE description. The textual description may be one or more documents. Preferably, in some designs, the textual description is an exploit report or intrusion log that details the use of the first vulnerability in the wild. An example textual descriptions of features of a particular CVE are depicted in Table 1, as follows:

TABLE 1

CVE Textual Description Example

| Feature Name | Example Description |
| --- | --- |
| MITRE Techniques | User Execution, Exploitation of Remote Services, Spear Phishing |
| CVE number | CVE-2017-8759 |
| CVE description | Microsoft .NET framework 2.0, 3.5, and 3.5.1 allows an attacker to execute code remotely via a malicious document or application |
| Attack Sequence | Document based: "An attacker crafts a malicious document to leverage the remote execution" Application based: "An attacker constructs a malicious .NET application and uploads it to a network device" |
| Mitigations and controls for defense | Web users should be cautious following links to sites provided by unfamiliar sources, filter HTML from emails, deploy intrusion detection system to monitor network traffic. |
| High level features | Authentication: not required; Availability: User initiated; Vendor: Microsoft; Classification: input validation error. |

Examples of various mitigation techniques that may be part of the textual description of a particular CVE are as follows:

TABLE 2

Mitigation Technique Descriptions

| Mitigation Category | Mitigation Strategy |
| --- | --- |
| Restrict/Deny | Do not follow links provided by unknown or untrusted sources. Block external access at the network boundary, unless external parties require service. Do not accept or execute files from untrusted or unknown sources. |
| Evaluate and Fix Default Config | Set web browser security to disable the execution of script code. Implement multiple redundant layers of security. Set web browser to disable the execution of Javascript. |
| Implement Physical Security | Do not allow untrusted users physical access to systems. Limit access to sensitive data or removable media. Allow only trusted individuals in range of WAN. |
| Implement Secure Communication Channel | Communicate through secure means or encryption. |
| Inspect and filter network traffic data | Deploy network intrusion monitoring. Filter malicious network data. Review logs for more information. |
| Use Strong Authentication | Implement multiple authentication mechanism. Use strong passwords. |
| Use of Least Privilege | Run all software as non-privileged users with minimal access rights. Limit privileges to minimal needed. |

At 804, the system parses text from the at least one first textual description in accordance with one or more rules. The rules may include selecting certain nouns, pronouns, verbs, and/or abbreviations from the textual description. The rules may include selecting words based on proximity to a named CVE or other keyword. The rules may include selecting or separating words based on whether the words precede a keyword or follow a keyword. The rules may be adapted for various languages. The parsing may include filtering and vectorizing the words. The resultant parsed text (e.g., after filtering, vectorizing, etc.) is referred to herein as a CVE "context". Accordingly, reference to the parsed text may refer to the literal parsed text, or alternatively a processed version of the parsed text.

At 806, the system determines at least one first label for the first vulnerability that is associated with one or more of a plurality of stages of an attack chain taxonomy. The system determination may be based on filtering, similarity scores, entropy, proximity, frequency, or other selection options. The determined labels may be embeddings or vectors. As will be described below in more detail, the label(s) may be determined based on a degree to which (or distance between) the CVE context(s) for a vulnerability or exploit are similar (or dissimilar) to a respective attack stage "concept". An attack stage concept may correspond to a textual representation of the attack stage, as will be described in more detail below.

Examples of attack stage types are as follows:

TABLE 3

Attack Stage Types

| Attack Stage | Types |
| --- | --- |
| Injection | Remote/local code, Command, HTML, OS Command, PHP Code, PHP Object, XML External Entity |
| File Based | Access, read, write, delete, upload, Remote/local include, Temporary/arbitrary creation, insecure file permissions |
| Bypass | Access, Authentication, Authorization, brute force, hard coded credentials, man in the middle URI processing |
| Session | Fixation, hijacking, manipulation, weak management |
| Credentials | Hard coded or default credentials, misconfiguration, predictable random number, weak password encryption, certificate spoofing |
| Entry | Document based, email based, application based, click jacking, request based |
| Escalation | Null pointer de-reference, overflow, heap based overflow, integer overflow, stack overflow, memory corruption |

Examples of concepts that are extracted (or derived) from an ATT&CK taxonomy are as follows:

TABLE 4

Concept Extractions from Attack Stage Textual Description

| ATT&CK Technique | Concepts Extracted |
| --- | --- |
| Valid Accounts | Default accounts, admin account, unauthorized creation of user accounts, default-accounts, predictable credentials |
| Virtualization/sandbox Evasion | Sandbox process, sandbox restrictions, sandbox protections, bypass sandbox protection |

TABLE 4-continued

Concept Extractions from Attack Stage Textual Description

| ATT&CK Technique | Concepts Extracted |
| --- | --- |
| Web service | Malicious web service |
| Web Shell | Shell upload, upload and execute arbitrary script |
| Winlogon Helper DLL | Unauthorized execution of DLL, creates malicious DLL |
| Spearphishing Attachment | Distributes the page and entices the user, phishing |
| Steal Web session cookie | Cookie theft, weak random session, malicious cookie, session impersonation, cookie guessing, session hijacking |
| System Network Connection Discovery | Manual scanning, port scanning, leaks protected network |

At 808, the system generates or refines a model that maps the parsed text to at least one first label associated with the one or more stages of the attack chain taxonomy. The model may include the joint latent space 506 and MLP classifier 507. The mapping may include arranging or scoring labels in the joint latent space 506 based on relevance, attack timing, or mitigation. In an example, new CVE descriptions become available frequently, whereas the attack chain taxonomy and associated concepts may change less frequently. The above-noted model may generally be applied with respect to new CVE description in a predictive manner so as to label the new CVE with regard to labels that are associated with one or more attack stages of a respective attack stage taxonomy, such as ATT&CK.

The model that is refined and/or generated in the final step of FIG. 8 may include the joint latent space 506 and the MLP classifier 507. The joint latent space 506 contains labels of different sizes from each of the embeddings modules. The MLP classifier 507 can then operate on labels of all different sizes and select sets of labels based on an input to the MLP classifier 507. Specifically, samples from two domains or sources such as the feature domain of CVE and corresponding ATT&CK domain are projected into the joint latent space which captures the structure of the labels, the encoded texts and the interactions between the two. Then the MLP classifier operates on the joint latent space which is independent of the label set size. The resulting model has the following properties: (i) Each head (i.e. encoders 503, 504, 505) of the MLP classifier of the model learns the label dependency from the attacker, defender, and CVE metadata point of view; (ii) Making the joint latent space 506 dimension independent of label size, such that input feature dimensions help the model to discover un-seen labels, and (iii) The model is trained as in FIG. 8 with cross-entropy loss and sigmoid function which is suitable for the multi-label variable-size classification problem.

Figure 10:
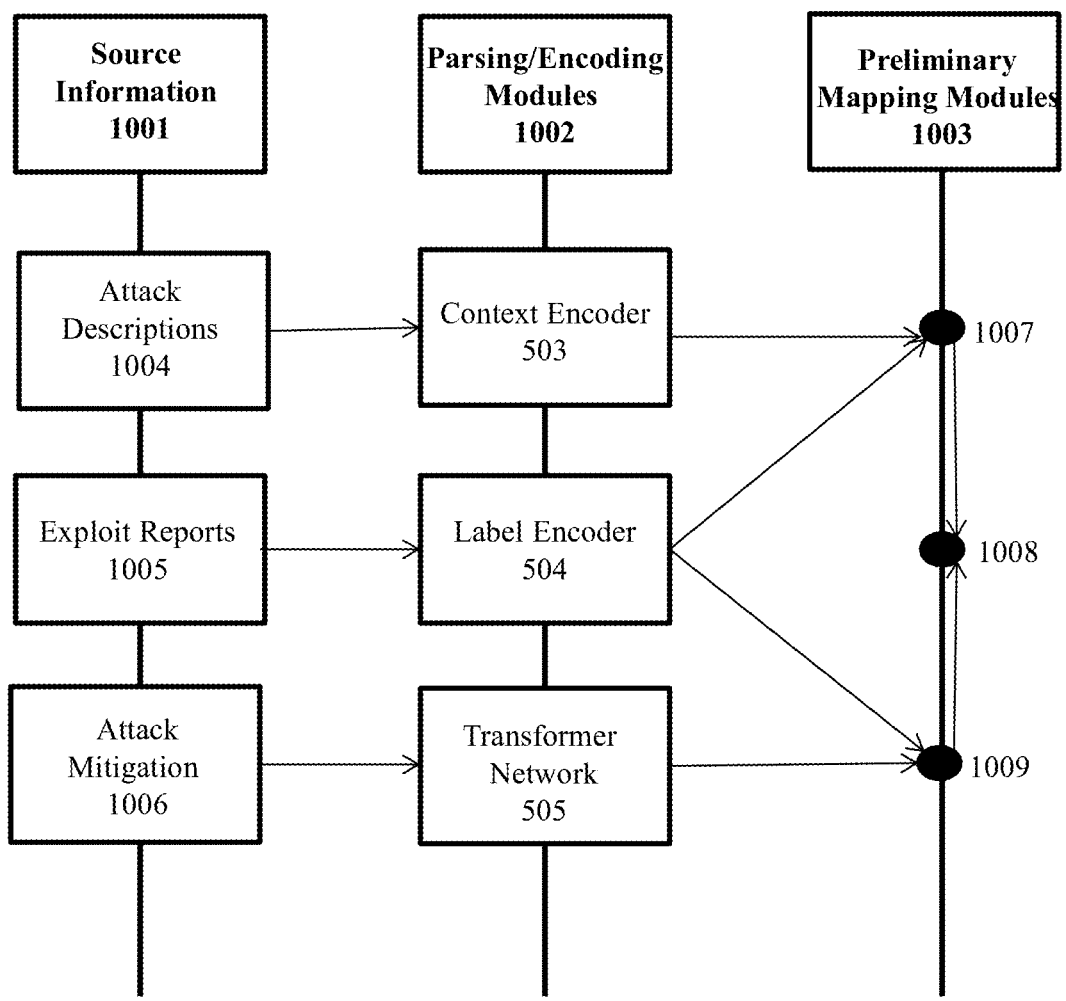
FIG. 10 illustrates a process for a sequence of stages for building the model in accordance with an embodiment of the disclosure.
Figure 11:
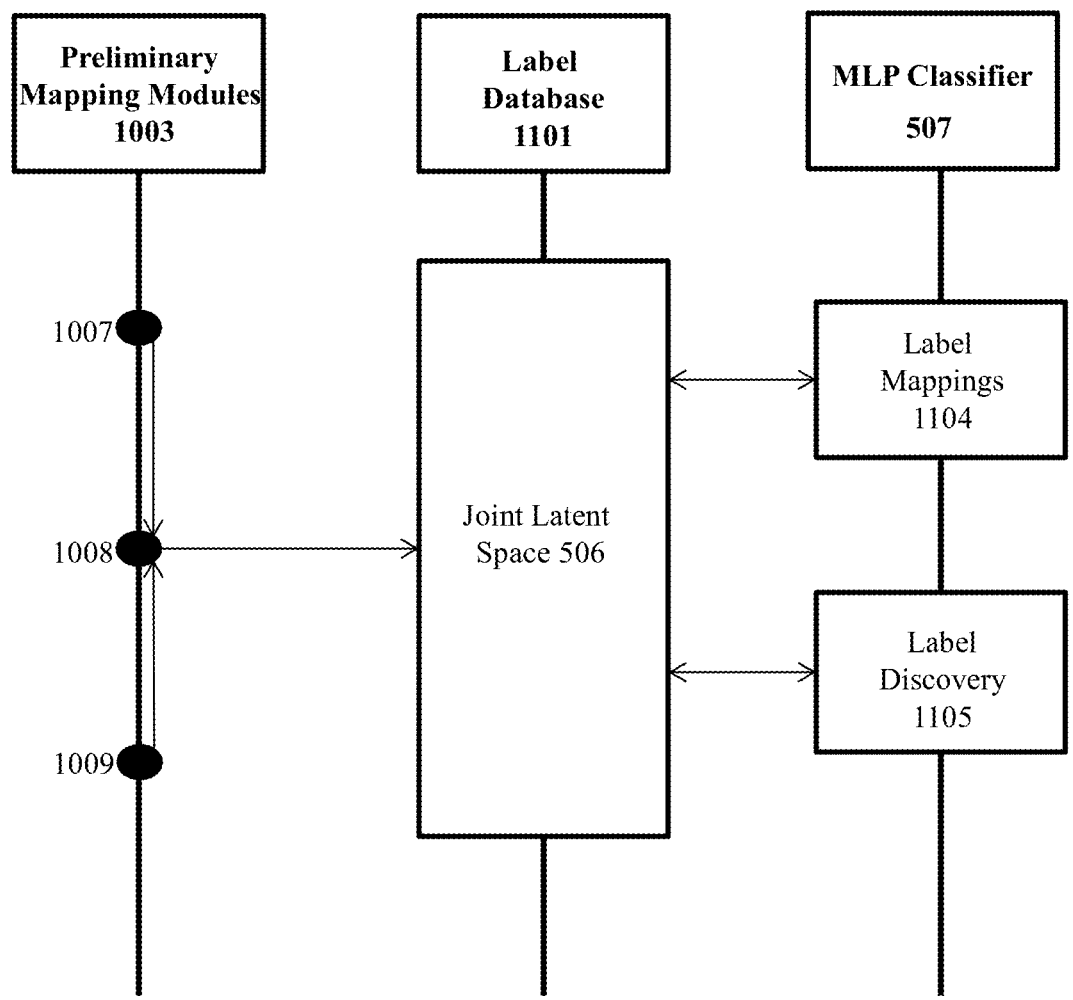
FIG. 11 illustrates a process for a sequence of stages for building the model in accordance with an embodiment of the disclosure.

The process 800 as illustrated in FIG. 8 is described in more detail in relation to FIG. 10-11. In particular, more structural detail is tied to various stages of the process. In addition, exemplary mathematical equations are described for performing one or more of the steps. In general, the system such as that illustrated in FIG. 1-6 may perform a method 800 that ultimately generates and refines a model for characterizing and prioritizing CVEs. The inputs may be textual descriptions of CVEs, exploit reports, mitigation techniques, ATT&CK descriptions, and intrusion logs that give a detailed description of how CVEs have been used in the wild.

Figure 9:
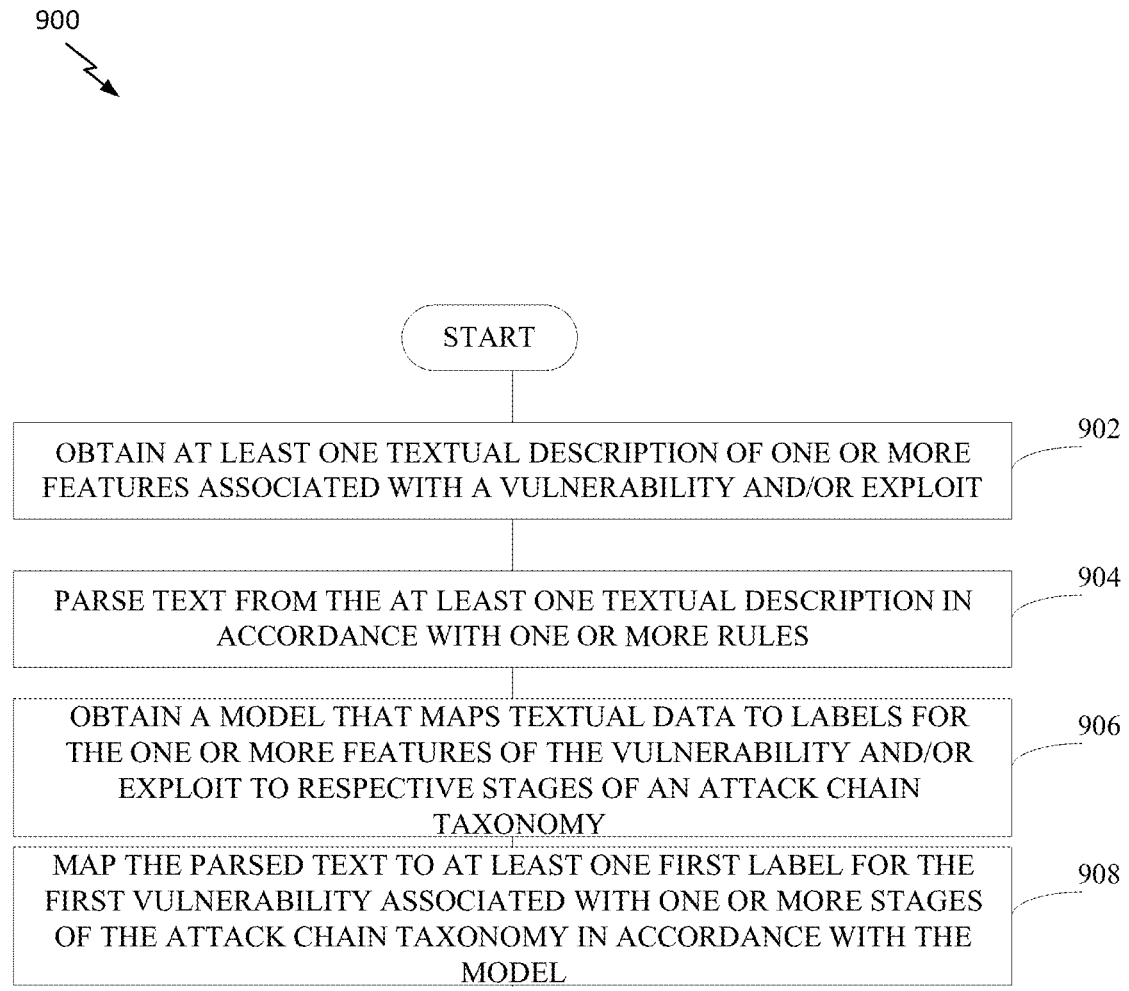
FIG. 9 illustrates a process for applying a model to new vulnerabilities in accordance with an embodiment of the disclosure.

In FIG. 9 a number of steps of process 900 are provided that execute to process data through the model built previously according to one implementation of the system. In particular, a system such as that illustrated in FIG. 1-6 may perform a method that characterizes and prioritizes one or more CVEs based on their description. Indeed, the steps may add or predict new, unknown, or previously unobserved features of the CVE. These added features may assist the vulnerability management system 250 in selecting which CVEs to address and how to recognize the use of a CVE in an attack sequence.

In particular, the system, at 902, may obtain at least one textual description of one or more features associated with a vulnerability and/or exploit. This textual description may be a CVE description, zero day description, exploit code sample, or other vulnerability description. The textual description may be contained in one or more documents and may be derived from the active or passive scanners 110 and 120 or the vulnerability management system 250.

The system, at 904, may parse text from the at least one textual description in accordance with one or more rules. The rules may include selecting certain nouns, pronouns, verbs, and/or abbreviations from the textual description. The rules may include selecting words based on proximity to a named CVE or other keyword. The rules may include selecting or separating words based on whether the words precede a keyword or follow a keyword. The rules may be adapted for various languages. Labels may be based on the words of the parsed text, inferred from the parsed text, or generated based on correlation with the parsed text. The system may perform filtering, similarity scores, entropy, proximity, frequency, or other selection options on the labels or parsed text. The labels may be embeddings or vectors.

At 906, the system obtains a model that maps textual data to labels for the one or more features of the vulnerability and/or exploit to respective stages of an attack chain taxonomy. The model may include the joint latent space 506 and MLP classifier 507. The mapping may include arranging or scoring labels in the joint latent space 506 based on relevance, attack timing, or mitigation.

At 908, the system maps the parsed text to at least one first label for the first vulnerability associated with one or more stages of the attack chain taxonomy in accordance with the model. That is, the system runs the acquired vectorized text for the vulnerability or CVE through the model to predict the stage(s) in the attack chain in which the CVE may potentially be used.

It should be noted that only the description of the CVE needs to be inputted to the process 900 for stages of the attack chain to be determined or mapped to the CVE. Therefore, the model is adding new knowledge, not merely processing exploit reports. Thus, CVEs which have yet to be used can be prioritized with far more knowledge and information by the vulnerability management system 250. In particular, the MLP classifier 507 utilizes the encoded labels to discover new connections, concepts, and labels from amongst the three dimensions of the joint latent space 506.

FIG. 10-11 illustrate example implementations of the processes 800-900 of FIGS. 8-9 in accordance with one or more aspects of the present disclosure. In particular, FIGS. 10-11 illustrate in more detail the timing, structure, and processes of the process 800 that builds the model, specifically the system that fills the joint latent space with labels and improves those labels. FIG. 10 illustrates a first portion of the process beginning with the source information 1001 and ending with the preliminary mapping modules 1003 which correspond to the combination nodes of FIG. 6. Then FIG. 11 illustrates a second portion of the system beginning with the preliminary mapping modules 1003 and ending with the MLP classifier 507.

Because very little structured, tagged, embedded or labeled data is available to describe CVEs, the system takes as inputs attack descriptions 1004 including CVE descriptions (as in 802), exploit reports 1005 with ATT&CK or attack stage descriptions, and attack mitigation steps 1006. These unstructured datasets may be raw text, a markup (e.g. XML), or other text format. The unstructured data is parsed into tokens or vectors by a natural language processor (e.g. word2vec) as part of 804 before being passed to the context encoder 503, the label encoder 504, and the transformer network 505.

The parsing of the unstructured data may begin with a word to vector encoder that identifies key terms or words (nouns in particular) and extracts surrounding descriptors to form a vector. According to one implementation, some or all nouns and verb phrases are extracted as candidates from the CVE descriptions. For each candidate, some or all words within the phrase and a window of N context words to each side of the phrase are used, the window being an implementation of the one or more rules of step 804. In particular, three separate sequences of words may become vectors: left context, the phrase, and the right context. For the labelling process to be accurate the similarity/dissimilarity between ATT&CK technique concepts and CVE description phrases or contexts is measured using various distance functions which may be the one or more rules of 804.

For example, below is a sentence from a threat report for CVE-2017-8759 highlighting left and right contexts around the phrase "CVE-2017-8759 exploit". "The [left context] malicious document[left context] containing CVE-2017-8759 exploit, [right context]downloads multiple components[right context], and eventually launches a FINSPY payload." The three vectors (right, phrase, left) may be composed again using an element-wise mean, c (Wl;Wp; Wr)=mean (mean (Wl); mean (Wp); mean (Wr)) The components of candidate vector c are the mean components of the words in the left context Wl, the words in the phrase Wp, and the words in the right context Wr.

For each of the parsing and encoding (embedding) modules 1002, the parsed text may be further processed through a bi-LSTM network, LSTM network, or another artificial recurrent neural network as a part of 804. The token embedding layer of the context encoder 503 takes a token as input and outputs its vector representation, given an input sequence of tokens xl ... xn, the output vector ei (i=1 ... n) of each token xi results from the concatenation of two different types of embeddings: token embeddings Vt(xi) and the character-based token embeddings (bi) that come from the output of a character-level and word-level bi-LSTM encoder. Features that have less contextual information but may contain out of vocabulary (OOV) tokens also pass through the token embedding layer to the joint latent space 506.

Likewise, label embeddings in the label encoder 504 are generated from a word to vector system with the LSTM model and are derived from the attack/intrusion techniques (e.g. ATT&CK) ymi=y1; y2 . . . yn and corresponding descriptions. Once the labels (concept labels) are generated by the label encoder 504, the labels are sent to the combination node 1007 where they are filtered and combined with the output of the context encoder 503. This combination of attack technique with the CVE or mitigation may be a part of the determining process of 806. The combination node 1007 may utilize a type of distance function such as cosine similarity, Fisher linear discrimination, $L^2$ (Euclidian) distance, Maximum Mean Discrimination (MMD), and other correlation functions.

The cosine similarity of concepts extracted from the ATT&CK or intrusion techniques and the phrases from threat reports may be given by: sim (phrase, concept)= (phrase·concept)/|phrase|$_2$·|concept|$_2$. Cosine similarity measures nearness of the phrase to the concept to assign labels. Finally, the following assign function labels a given phrase (CVE) from threat report with relevant technique labels.

assign (phrase)=arg max sim(phrase, c)

The techniques having the highest cosine similarity with the phrases are assigned the label as the technique which is likely to be used with the CVE as in 808.

The joint latent space 506 between two ATT&CK techniques domains and the CVE feature domain is created by a component-wise multiplication of each embedding type with label embedding for their joint representation given by:

$$h_{AJ}^{(ij)} = h_j^y \cdot h_i^A \text{ and } h_{MJ}^{(ij)} = h_j^y \cdot h_i^M,$$

where $h_i^y$ is the label embedding, $h_i^A$ is the mitigation or transform embedding, and $h_i^M$ is the context embedding. The probabilities for each are calculated as: $p_A^{(ij)} = h_{AJ}^{(ij)} \omega_A + b_A$ and $p_M^{(ij)} = h_{MJ}^{(ij)} \omega_M + b_M$. The probability for h belongs to one of the k known labels and is modeled by a linear unit that maps any point in the joint space into a score which indicates the validity of the combination, where $\omega \in R^{dj}$ and b are scalar variables and $d_j$ is the number of CVE exploits input for training. Therefore, the $h_{AJ}^{(ij)}$ dot product or component-wise multiplication is an implementation of combination node 1009 and the $h_i^M$ dot product or component-wise multiplication is an implementation of combination node 1007.

Finally, the output of combination node 1007 and combination node 1009 combined with the probabilities creates a multi-dimensional joint latent space 506 or model where attack chain description labels are mapped to CVE description labels and mitigation labels as in 808. These mapped labels are joined in a single joint latent space 506 via dot product or combination node 1008 as illustrated in FIG. 10 and FIG. 11. The resulting joint space has an independent label dimension.

A training set with N samples is given as Dtr={(xi,ymi), i=1, . . . ,N}, with xi={xdi,xsi,xci,xti} where xdi is textual description of CVE, xsi represents sequence of steps to exploit the CVE, xci denotes mitigation steps and controls needed to reduce the attack surface for the CVE, xti represents the high level characteristics of the CVE namely CPE, CVSS base and temporal strings, CWE, classification of the CVE, credibility, local vs remote CVE, severity, and ymi denote the corresponding ATT&CK intrusion techniques represented as ymi=y1,y2 . . . yn for the sample xi.

The system categorizes the first vulnerability into one or more of a plurality of stages of an attack chain taxonomy. The categorization when building the model may be a manual process based on the exploit or intrusion report. The categorization may be automated based on imported attack techniques, parsing of the exploit report, and/or learning from other labels and categories. The system may use a past categorization or receive a categorization of the first vulnerability into the attack chain taxonomy (e.g. ATT&CK).

For a pre-trained token embedding, a word to vector coder (e.g. word2vec) may be trained with a window size of 8, a minimum vocabulary count of 1, and 15 iterations. The negative sampling number is set to 8 and the model type may be skipgram. The dimension of the output token embedding is set to 300. The transformer network may be configured with 2 transformer blocks, with hidden size of 768 and a feed-forward intermediate layer size of 4×768, i.e., 3072, the hidden size relating to hidden layers of the feed forward neural network. The 768-dimensional representation obtained from the transformer is pooled by the decoder which is a five-layer feed-forward network with rectified linear unit (ReLU) nonlinearity in each layer with a hidden size of 200, and a 300-dimensional output layer for the embedding.

An implementation of the labeling and filtering pipeline 600 on a sample of 62,000 CVE records identified the attack sequences below (with count >100). As can be noted, these attack sequences are far more detailed than the four attack sequences/categories of the ATT&CK framework and those techniques listed Tables 3 and 4:

TABLE 5

Discovered Attack Sequences (record count > 100 reported)

| Attack Sequences | CVE record count |
| --- | --- |
| Steal web session cookie, web session cookie | 103 |
| Spearphishing attachment | 106 |
| Exploit public facing application, exploitation for defense evasion, file and directory permissions modifications | 117 |
| Command line interface, exploitation of remote services | 119 |
| Install root certificate | 129 |
| Exploitation for defense evasion, web shell | 130 |
| Shortcut modification, taint shared content | 143 |
| Exploit public-facing application, user execution | 144 |
| Command line interface | 152 |
| File and directory permissions modification | 180 |
| Compiled HTML file, Exploit public-facing application | 193 |
| Exploit public-facing application, Exploitation for defense evasion | 258 |
| Exploit public-facing application, Spearphishing attachment | 277 |
| User Execution | 311 |
| Exploitation for defense evasion, Spearphishing attachment | 385 |
| Exploitation for defense evasion, exploitation of remote services, User Execution | 409 |
| Command line interface, Exploit public-facing application, | 429 |
| Account Manipulation | 430 |
| Exploitation for defense evasion, Install root certificate | 789 |
| Exploitation for defense evasion, Exploitation for privilege escalation | 1004 |
| Exploitation for defense evasion, User Execution | 1120 |
| Exploitation for privilege escalation | 1609 |
| Exploitation for defense evasion, Exploitation of remote services | 2174 |

TABLE 5-continued

Discovered Attack Sequences (record count > 100 reported)

| Attack Sequences | CVE record count |
| --- | --- |
| Exploitation of remote services | 3994 |
| Exploit public-facing application | 7833 |
| Exploitation for defense evasion | 11108 |

In FIG. 11, the combination nodes 1007 and 1009 are shown feeding the central mapping node 1008 which builds the joint latent space 506 housed in the label database 1101 of the data manipulator 502 as part of 808. The MLP classifier 507 is trained on the joint latent space 506. In particular, the classifier is trained with a binary cross-entropy loss and apply the sigmoid function:

$$\hat{y}_i = p(y_i | x_i) = \frac{1}{1 + e^{-p_{val}^{(i)}}}$$

Given the sample input xi and the associated labels ymi, the trained classifier is able to predict labels both in the seen, Ys, or unseen, Yu, label sets, defined as the sets of unique labels which have been seen or not during training respectively and, hence, Y∩Yu=∅; and Y=Ys∪Yu. The newly discovered labels may be mapped to CVEs or used to identify new uses for CVEs or new mitigation techniques for CVEs. Alternatives for training include exponential linear units, rectified linear units, scaled exponential linear units, Gaussian error linear units, and leaky rectified linear units.

This novel label discovery is performed by label discovery engine 1105 as part of the refining feature of 808. There are only four ATT&CK techniques (Exploit Public-Facing Application, Exploitation for Client Execution, Exploitation for Privilege Escalation, Exploitation of Remote Services) which cover the exploitation phase of the attack chain but there are no more granular categories that can be mapped. Accordingly, the MLP classifier 507 utilizes label mappings engine 1104 and label discovery engine 1105 to add more granularity to the intrusion techniques in 808. Old CVEs which were assigned to an ATT&CK technique can be reassigned to a new technique based on the evolution of attackers methods over time. New techniques, CVEs, attack scenarios, and mitigations are constantly added to combat new threats and the old model still has to work with new concept drift data.

The system enriches CVEs with a curated knowledgebase of 150 attack scenarios for exploiting vulnerabilities and 50 mitigation strategies which help the model to learn both attacker and defender view of a given CVE. The system was tested with a dataset containing CVEs disclosed from the past 10 years and compared with standard baseline models and ablation analysis. Using the resulting model, 62,000 CVE records were mapped to different ATT&CK techniques and identified 135 unique attack sequences (an attack sequence can be viewed as a set of one or more of ATT&CK attack techniques assigned to one CVE record).

Various models including BI-LSTM, Attention-based BI-LSTM, and TD-IDF-based SVM multi-label classifiers may also be used as the classifier. The term frequency-inverse document frequency (TF-IDF) approach represents all textual features as vectors with the same length as the vocabulary of the entire text corpus. For the term frequency-inverse document frequency (TF-IDF) model, each entry in the vector corresponds to a unique word, and its weight gives the frequency of that word in the post divided by its document frequency. These document vectors are then used in the classification task. Also since TF-IDF results in high-dimensional representations, a support vector machine (SVM) is applied on the TF-IDF features. In testing, the MLP classifier 507 operating on the three filtered and combined label domains generates the best results.

The efficiency of the various models may be given by their correlation scores, which are provided in Table 6 below for various baselines (P@1, P@3, P@5):

TABLE 6

Model performance for various baselines

| Model | P@1 | P@3 | P@5 |
|---|---|---|---|
| Bi-LSTM + MLP | 0.8557 | 0.8223 | 0.838 |
| Attention-Based Bi-LSTM + MLP | 0.8757 | 0.8234 | 0.848 |
| TD-IDF + SVM | 0.7619 | 0.6246 | 0.686 |
| Proposed Model | 0.9316 | 0.9589 | 0.945 |

Likewise, the model run with ablation testing for various layer combinations of the model had the following efficiency scores:

TABLE 7

Ablation test of various layers/encoders of the model

| | Labels | | |
|---|---|---|---|
| Layer | P@1 | P@3 | P@5 |
| $h^M$ + MLP | 49.84% | 32.27% | 24.17% |
| $h^A$ + MLP | 70.40% | 54.98% | 44.86% |
| ($h^A \cdot h^M$) + MLP | 85.28% | 61.12% | 52.78% |
| ($h^A \cdot h^M \cdot h^y$) + MLP | 93.16% | 95.89% | 94.50% |

Figure 12:
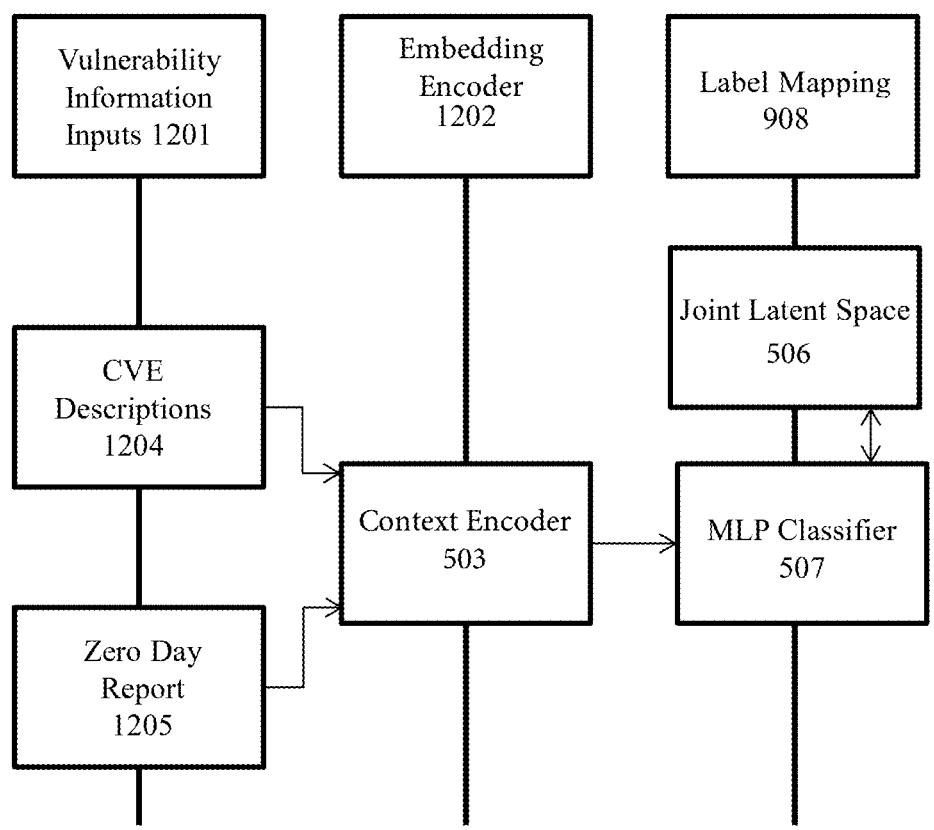
FIG. 12 illustrates a process for a sequence of stages for applying the model in accordance with an embodiment of the disclosure.

The model developed in process 800 and FIG. 10-11 may then be used, applied, or executed for a new CVE outside the training set as shown in FIG. 12 and process 900. Specifically, the system receives unstructured vulnerability information inputs 1201 to begin the process as in 902. These inputs 1201 may include CVE descriptions 1204 and zero day reports or code 1205 pertaining to a CVE outside the training set that the vulnerability management system 250 needs prioritized or characterized. Notably, the CVE or vulnerability may not yet have been used or described as part of an attack chain. The unstructured inputs 1201 may then parsed by a word-to-vector natural language processor into tokens as part of 904 (other word parsers may be used).

The context encoder 503 receives the tokens and performs several filtering operations using a bi-LSTM model or other filtering engine. The filtering results of context encoder 503 or embedding module 1202 determine or select of one or more labels at 904 that characterize the CVE. These labels are then passed to the MLP classifier 507 which places them in the joint latent space 506 as part of the label mapping 908. The context encoder 503 may also output to a combination node where the context labels from the CVE are matched with attack techniques from a label encoder 504 as part of 908.

A mapping in the form of a heat map of MITRE ATT&CK tactics and technique produced by the proposed model for CVE dataset is shown in FIGS. 13A and 13B combined. The numbers in each cell correspond to CVE count for a particular tactic and technique. The basic CVE descriptions when mapped to corresponding ATT&CK techniques and tactics can help defenders to correctly assess the risk and understand at which stage of the attack cycle the corresponding CVEs are being used. The MLP classifier 507 may then operate on the labels to place the labels in the appropriate place in the joint latent space 506. In particular, the MLP classifier 507 may assign attack stages and mitigation strategies from those two feature/label domains of the joint latent space 506. In addition to selecting the best attach technique and mitigation strategy labels from the joint latent space 506, the MLP classifier 507 also feeds the new labels received for the mapped CVE into the joint latent space 506 to improve and refine the model, which may be part of 908, as shown by the double headed arrow.

The MLP classifier 507 or the larger data manipulator 502 and computing device 501 may then transmit the resulting characterization, attack chain taxonomy, and mitigation strategies to the vulnerability management system 150/250 or database(s) 508. The vulnerability management system 150/250 may then perform the mitigation strategies or instruct one of the other system elements (110, 120, 130, or 140) to implement all or part of the mitigation strategies. The mitigation strategy may include port blocking, patching, code scanning, packet scanning, or other prevention measures for a known CVE. The vulnerability management system 150/250 may also apply the characterization from the MLP classifier 507 to prioritize the fixing of the CVE relative to other CVEs based on other system information.

Those skilled in the art will appreciate that information and signals may be represented using any of a variety of different technologies and techniques. For example, data, instructions, transmissions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of semantic model training, comprising:
   obtaining, based on parsing first data, at least one first textual description of one or more features associated with a first vulnerability that has been used in one or more attacks;
   determining at least one context label for the first vulnerability based on the at least one first textual description and one or more rules;
   obtaining, based on parsing the first data, at least one concept label for the first vulnerability, wherein the at least one concept label corresponds to one or more stages of a plurality of stages of an attack chain taxonomy;
   obtaining, based on parsing the first data or second data, at least one mitigation label for the first vulnerability, the at least one mitigation label corresponding to one or more mitigation steps;
   generating or refining a model based on execution of a machine learning process and a training sample;
   inserting the at least one context label for the first vulnerability into a joint label space;
   inserting at least one technique description related to one or more intrusion techniques into the joint label space; and
   generating at least one technique label for the first vulnerability based on the joint label space,
   wherein the generating the at least one technique label is based on a distance function between the at least one technique description and the at least one context label,
   wherein the training sample corresponds to mapping a combination of at least (i) the at least one context label for the first vulnerability and (ii) the at least one mitigation label for the first vulnerability to the at least one concept label for the first vulnerability, and
   wherein the model includes a classifier that is configured to map at least one context label for a second vulnerability to at least one concept label for the second vulnerability.

2. The method of claim 1, wherein the first data or the second data comprises:
   an intrusion or exploit report,
   a proof-of-concept,
   a zero-day report,
   an adversarial tactics, techniques and common knowledge (ATT&CK) description,
   a mitigation technique description,
   a patch description,
   a description of a sequence of steps for exploit,
   a rating-level characterization of a vulnerability,
   a vulnerability description, or
   any combination thereof.

3. The method of claim 1, further comprising:
   obtaining, based on parsing third data, at least one second textual description associated with the second vulnerability;
   determining the at least one context label for the second vulnerability based on the at least one second textual description and the one or more rules; and
   mapping the at least one context label to the at least one concept label for the second vulnerability corresponding to at least one stage of the attack chain taxonomy based on the model.

4. The method of claim 1, wherein the generating or refining includes:
generating labels of a joint label space by a multi-label text classification model having at least two label encoding heads.

5. The method of claim 4,
wherein a first head of the at least two label encoding heads comprises a context encoder that encodes vector representations of words associated with the first vulnerability, and
wherein a second head of the at least two label encoding heads comprises a concept encoder that identifies the one or more stages of the attack chain taxonomy associated with the first vulnerability as labels.

6. The method of claim 5, wherein a third head of the at least two label encoding heads encodes attacker actions or mitigation techniques.

7. The method of claim 6,
wherein an output of the first head and an output of the second head are combined and inserted into the joint label space, and
wherein the output of the second head and the third head are combined and inserted into the joint label space.

8. The method of claim 4, further comprising:
training a multi-layer perceptron classifier via machine learning on the joint label space.

9. A method, comprising:
obtaining, based on parsing data, at least one textual description of one or more features associated with a vulnerability and/or exploit;
determining at least one context label for the vulnerability and/or exploit based on the at least one textual description and one or more rules;
mapping, based on a classifier of a model, the at least one context label for the vulnerability and/or exploit to at least one concept label for the vulnerability and/or exploit;
inserting the at least one context label for the vulnerability and/or exploit into a joint label space,
inserting at least one technique description related to one or more intrusion techniques into the joint label space, and
generating at least one technique label for the vulnerability and/or exploit based on the joint label space,
wherein the generating of the at least one technique label is based on a distance function between the at least one technique description and the at least one context label,
wherein the at least one context label for the vulnerability and/or exploit corresponds to one or more stages of a plurality of stages of an attack chain taxonomy,
wherein the model is trained based on execution of a machine learning process and a training sample, and
wherein the training sample corresponds to mapping a combination of at least (i) at least one context label for a training vulnerability and (ii) at least one mitigation label for the training vulnerability to at least one concept label for the training vulnerability.

10. The method of claim 9, wherein the classifier is configured to operate on a joint latent space of the model, the classifier assigning labels to the vulnerability and/or exploit from a label set of the joint latent space.

11. The method of claim 10, wherein a size of the label set is independent of the joint latent space.

12. The method of claim 9, the classifier is configured to predict labels for the vulnerability and/or exploit based on the at least one context label for the vulnerability and/or exploit, the labels being derived from a first label set of a joint latent space observed during training of the model and a second label set of the joint latent space not observed during the training of the model.

13. The method of claim 9, wherein the one or more rules comprise:
a rule for selecting certain nouns, pronouns, verbs, and/or abbreviations from the at least one textual description,
a rule for selecting words based on proximity to a named instance of the vulnerability,
a rule selecting or separating words based on whether the words precede a keyword or follow a keyword, or
any combination thereof.

14. An apparatus, comprising:
a memory; and
at least one processor coupled to the memory and configured to:
obtain, based on parsing data, at least one textual description of one or more features associated with a vulnerability and/or exploit;
determine at least one context label for the vulnerability and/or exploit based on the at least one textual description and one or more rules;
map, based on a classifier of a model, the at least one context label for the vulnerability and/or exploit to at least one concept label for the vulnerability and/or exploit,
insert the at least one context label for the vulnerability and/or exploit into a joint label space,
insert at least one technique description related to one or more intrusion techniques into the joint label space, and
generate at least one technique label for the vulnerability and/or exploit based on the joint label space,
wherein the generation of the at least one technique label is based on a distance function between the at least one technique description and the at least one context label,
wherein the at least one context label for the vulnerability and/or exploit corresponds to one or more stages of a plurality of stages of an attack chain taxonomy,
wherein the model is trained based on execution of a machine learning process and a training sample, and
wherein the training sample corresponds to mapping a combination of at least (i) at least one context label for a training vulnerability and (ii) at least one mitigation label for the training vulnerability to at least one concept label for the training vulnerability.

15. The apparatus of claim 14, wherein the classifier is configured to operate on a joint latent space of the model, the classifier assigning labels to the vulnerability and/or exploit from a label set of the joint latent space.

16. The apparatus of claim 15, wherein a size of the label set is independent of the joint latent space.

17. The apparatus of claim 14, wherein the classifier is configured to predict labels for the vulnerability and/or exploit based on the at least one context label for the vulnerability and/or exploit, the labels being derived from a first label set of a joint latent space observed during training of the model and a second label set of the joint latent space not observed during the training of the model.

18. The apparatus of claim 14, wherein the one or more rules comprise:
- a rule for selecting certain nouns, pronouns, verbs, and/or abbreviations from the at least one textual description,
- a rule for selecting words based on proximity to a named instance of the vulnerability,
- a rule selecting or separating words based on whether the words precede a keyword or follow a keyword, or
- any combination thereof.

* * * * *